United States Patent [19]

Patterson et al.

[11] Patent Number: 4,726,926
[45] Date of Patent: Feb. 23, 1988

[54] MIXING GRID

[75] Inventors: John F. Patterson, Richland; Wayne A. VonOlnhausen, Kennewick; Jack Yates, Richland, all of Wash.

[73] Assignee: Advanced Nuclear Fuels Corporation, Bellevue, Wash.

[21] Appl. No.: 16,432

[22] Filed: Feb. 19, 1987

Related U.S. Application Data

[63] Continuation-in-part of Ser. No. 838,768, Mar. 12, 1986, abandoned.

[51] Int. Cl.⁴ .......................... G21C 3/34; G21C 3/30
[52] U.S. Cl. ..................................... 376/439; 376/443
[58] Field of Search .............................. 376/439, 443

[56] References Cited

U.S. PATENT DOCUMENTS 3,787,285  1/1974  Marstrand ........................... 376/439

FOREIGN PATENT DOCUMENTS

| 0148452 | 7/1985 | European Pat. Off. . |
| 1439362 | 4/1969 | Fed. Rep. of Germany . |
| 2738615 | 3/1979 | Fed. Rep. of Germany . |
| 3519421 | 12/1986 | Fed. Rep. of Germany ...... 376/439 |
| 460965 | 10/1968 | Switzerland . |
| 1167502 | 10/1969 | United Kingdom . |

OTHER PUBLICATIONS

7020 Nuclear Engineering International 30 (1985), Sep., No. 374, Sutton, Surrey, Great-Britain, "Westinghouse Introduces New Fuel for PWRS and BWRS", by W. L. Orr and D. C. McClintock, pp. 53–55.

Primary Examiner—Donald P. Walsh
Attorney, Agent, or Firm—Volker R. Ulbrich; R. K. Sharp

[57] ABSTRACT

A grid for use in nuclear fuel assemblies is made up of double grid members which are deformed so as to provide channels for the coolant. At least the upper portions of these channels are inclined relative to the axes of the fuel rods and are disposed in such a manner as to cause circulation of fluid about each individual rod and within the assembly. In one embodiment the grid is positioned between the positioning grids and serves primarily as a coolant deflector. In another embodiment so constructed as to serve the positioning grid, as well as a flow deflector, the channels are straight in their lower portions i.e. parallel to the axes of the fuel rods. In their upper portions they curve to provide the desired deflection of the cooling fluid and the straight sections have a slight bow outward, relative to the plane of the grid member of which they are a part. This outwardly bowed portion engages the fuel rod and acts as a positioning spring. The grid members are cut away adjacent the straight sections to give the necessary flexibility. This design is particularly useful in pressurized water reactors. In grids intended for use in boiling water reactors, where the lateral loading is less severe, the straight portion can be omitted. The two plates may be welded together at their intersections, at their upper edges only, while the lower edges are left free. In this case, the flexing of the grid members themselves serves to provide the spring forces necessary to position the fuel rods. In order to give improved flexibility, and proper fit with the rods when loaded, the surfaces of the channels which contact the fuel rods are given a twisted or helical formation.

16 Claims, 13 Drawing Figures

MIXING GRID

This is a continuation-in-part of application Ser. No. 838,768, filed Mar. 12, 1986, now abandoned.

INTRODUCTION

This invention deals with a mixing grid for use in nuclear reactor fuel assemblies. Its purpose is to secure and improve mixing of coolant within the assembly, and in some embodiments to also serve as a positioning grid to hold the fuel rods in their intended posistions.

BACKGROUND

In nuclear reactors intended for the generation of power, nuclear fuel elements are customarily of the rod type. These rods are grouped in assemblies in which a large number of rods, arranged in parallel and closely spaced, are held in a generally rectangular, square, or other polygonal configuration. In water-cooled reactors, the rods are usually held in position by spacer grids which are made of comparatively narrow, thin plates arranged in "egg crate" construction, with intersecting members positioned at right angles to each other. Springs on some of the members force fuel rods against dimples, which are usually comparatively rigid and arranged opposite to the springs within cells formed by the intersecting grid members.

The flow of cooling water is parallel to the rods, and, in order to secure efficient cooling, it is highly desirable that the flow be made turbulent or swirling. It is also desirable to have fluid circulation between different parts of an assembly, and between assemlbies, since different rods generate different amounts of heat. In order to produce the desired motion of cooling water, it has been usual to provide deflectors within the assembly. The most common way the deflectors have been provided is directly on the positioning grids as shown, for example, in U.S. Pat. No. 3,379,619 to H. N. Andrews et al. Special forms of deflectors have been devised in order to improve the efficiency of mixing, as shown by U.S. Pat. No. 4,039,379 to John F. Patterson and Kirk P. Galbraith. It has also been known to provide special "mixing vane grids," located between the positioning grids, as shown in U.S. Pat. No. 3,395,077 to L. S. Tong et al.

Some grid designs which depart from the general descriptions given above are shown in U.S. Pat. No. 3,281,327 to J. Webb et al and U.S. Pat. No. 3,813,288 to B. Leaver et al. The Webb et al. patent shows a spacer grid made up of inclined plates, through which the fuel rods pass. The inclination of the plates is such as to cause them to act as deflectors for the cooling fluid. The Leaver et al. patent shows a grid made up of double grid members which, by their own flexibility, provide the "spring" action to hold the fuel rods. There is no provision made for deflecting the cooling water out of its path parallel to the fuel rods.

One of the power losses sustained by a nuclear reactor is the energy involved in forcing the cooling water through the reactor core. It is, therefore, highly desirable that the design of the grids, both those for supporting the fuel rods and those for causing circulation of the cooling water, offer as little resistance to flow as possible. It is, therefore, an object of this invention to provide a grid which gives optimum circulation of cooling water about the fuel rods, while offering the minimum resistance to flow. It is also desirable for the entire grid to be made of a metal which offers minumum neutron absorption during reactor operation.

SUMMARY OF THE INVENTION

This invention is directed to a grid made of double grid members, which are deformed so as to provide channels for the coolant. These channels are inclined relative to the axes of the fuel rods, and are disposed in such a manner as to cause a circulation of fluid about each individual rod and within the assembly. This produces a more positive circulation of fluid than is produced by the deflectors referred to above. At the same time, it produces a reduction in the flow resistance of the grids, and thus, in the power wasted in pumping the cooling fluid through the reactor core.

In one embodiment, the grid just described is positioned between the positioning grids, and serves primarily as a coolant deflector.

In another embodiment, so constructed as to serve as a positioning grid as well as a flow deflector, the channels are straight in their lower portions, i.e. parallel to the axes of the fuel rods. In their upper portions, they curve to provide the desired deflection of the cooling fluid. In the straight sections, they have a slight bow outwardly, relative to the plane of the grid member of which they are a part. This outwardly bowed portion engages the fuel rod and acts as a positioning spring. The members are cut away adjacent the straight sections to give the necessary flexibility. This design is particularly useful in pressurized water reactors, where, because there are no walls between assemblies, the lateral loading due to, for example, earthquakes, is particularly severe.

In grids intended for use in boiling water reactors, where the lateral loading is less severe, the straight portion can be omitted. The two plates are welded together at their intersections at their upper edges only, while the lower edges are left free. In this case, the flexing of the grid members themselves serve to provide the spring forces necessary to position the fuel rods.

DETAILED DESCRIPTION

Figures 1, 1A, 1B:
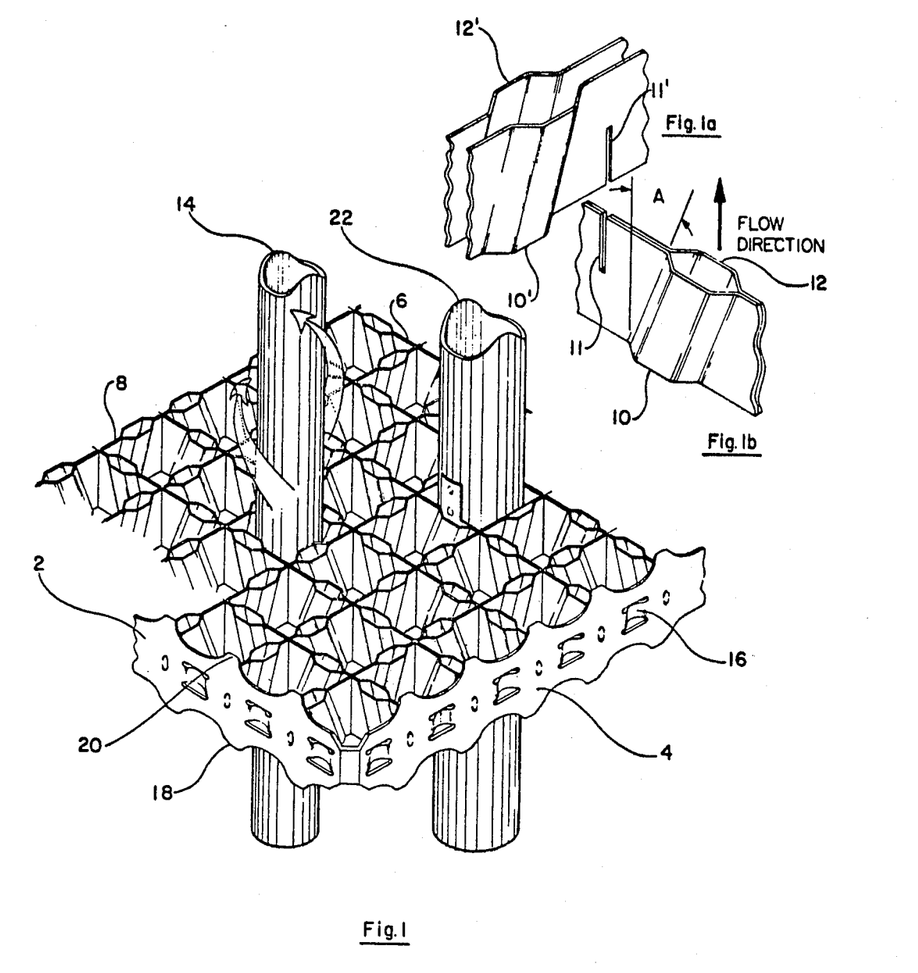
FIG. 1 is a partial perspective view of the form of grid used as an intermediate deflector.
FIGS. 1a and 1b are fragmentary views showing the structure of the deflector grid members.

Referring to the drawing, FIG. 1 shows the form of mixing grid used as an intermediate grid, mainly for the purpose of deflecting coolant. The grid includes a perimeter strip, of which two sides, 2 and 4, are shown extending at right angles to each other. It will be understood that two additional sides, parallel to members 2 and 4, complete the perimeter of the grid. The grid is made up of two sets of intersecting grid strips. One set, typified by member 6, is parallel to perimeter strip 2. The other set, typified by member 8, is parallel to strip 4. Each grid strip is made up of two flat, narrow sheets, as shown in FIGS. 1a and 1b. They are provided with notches, 11,11', which interfit when the grid is assembled. The strips may then welded together at their intersections at the upper or lower edge, or both, or the welding may be omitted.

Each of these sheets is deformed as best shown in FIGS. 1a and 1b to provide channel-shaped "dimples" 10, 12, 10', 12'. These dimples are inclined to the vertical by an angle A (FIG. 1b). Each pair of dimples 10, 12, 10', 12', forms a nozzle which is similarly inclined to the direction of the bulk flow of cooling fluid indicated by the arrow in FIG. 1b. As shown in FIG. 1, these nozzles are distributed about each rectangular space formed by the grid strips 6, 8 so as to produce a circulating flow about the space and about the fuel rod which is positioned therein. The radial component of flow is sufficient to cause part of the fluid to flow outwardly into the flow channels formed by other rods, thus producing equalization of coolant temperature, adjacent to rods operating at different power levels.

These fuel rods, one of which is indicated at 14, press against the dimples 10, 12, 10', 12'. The deformation of the dimples should be within their elastic limits, so as to prevent flexing beyond their yield points during rod loading. Yielding could cause gaps to form between the rods and supports, leading to fretting-corrosion during reactor operation. The inclination of the flow nozzles causes, as has been noted, circulation of the water about the fuel rods. The arrangement is such that the net direction of circulation alternates between adjacent rods (clockwise or counterclockwise), resulting in no net torque on the fuel bundle. Peripheral support dimples 16 are formed in the perimeter strips 2, 4, and inwardly inclined guide tabs 18, 20 are formed on the upper and lower edges of strips 2 and 4 to prevent "hang-up" during loading.

The grid thus far described is normally positioned about half way between normal spacer grid locations in those portions of the core in which there is the greatest danger of "departure from nucleate boiling" (DNB). This provides two benefits. First, increased coolant mixing within the bundle, and second, reduction in rod bow during irradiation, due to additional rod support. The angle A may be varied in accordance with the particular characteristics of the reactor. A typical value is about 10 degrees.

In some of the grid spaces formed by members 6 and 8 the fuel rods are replaced by guide tubes 22 which are permanently attached to the grids and serve the dual purpose of guiding control rods which are inserted into the reactor core and holding the grids in positon.

Figures 2, 2A:
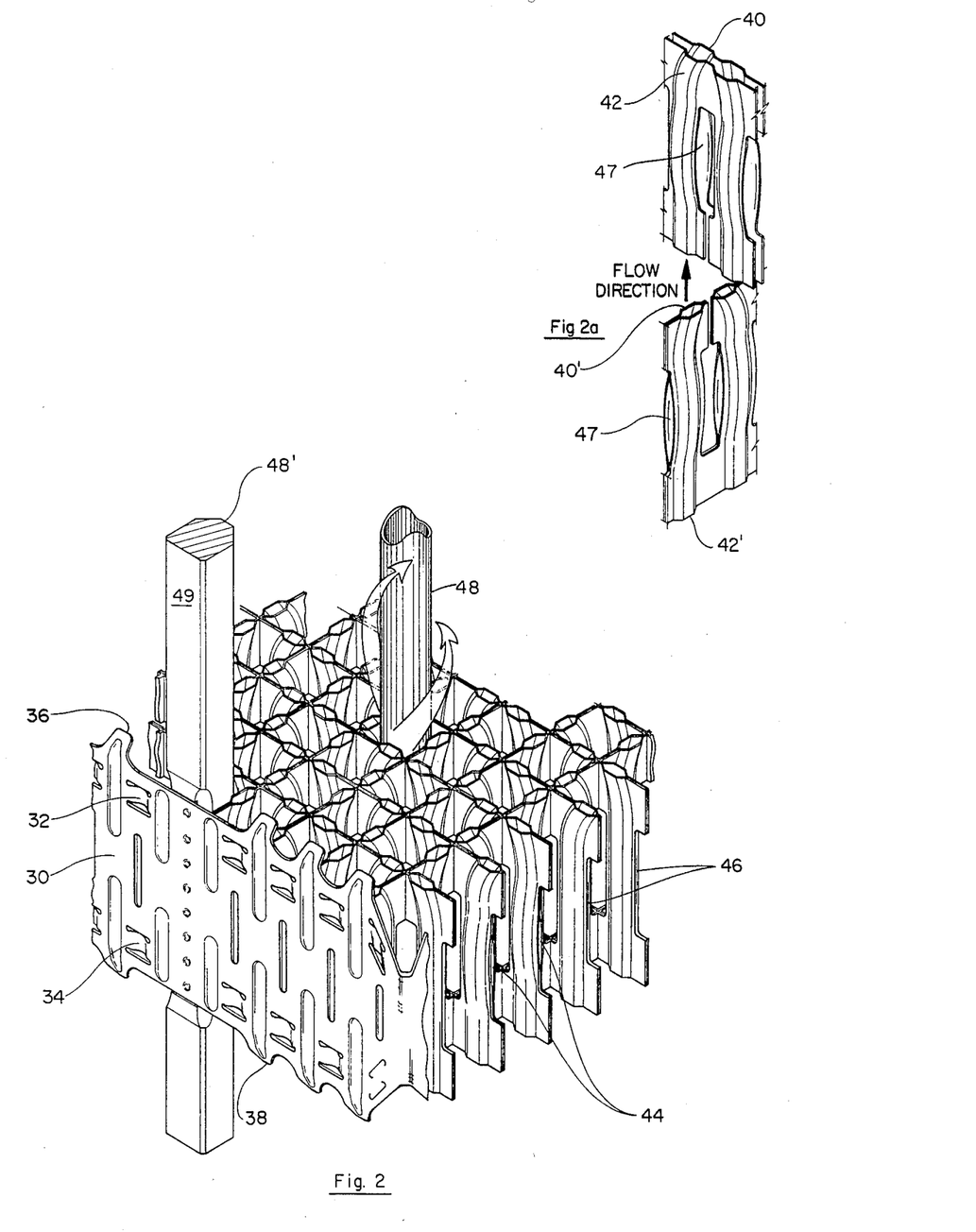
FIG. 2 is a partial perspective view, showing the combination support-deflector grid used with pressurized water reactors.
FIG. 2a is a fragmentary view showing details of the structure of FIG. 2.

FIG. 2 shows a grid which has the dual function of being one of the principal positioning grids for the fuel rods and a deflecting grid for the coolant. The form shown in this figure is particulary adapted for use in pressurized water reactors. Like the grid shown in FIG. 1, the grid of FIG. 2 is provided with four perimeter strips at right angles to each other, one of which is shown at 30. Like the perimeter strips of FIG. 1, those of FIG. 2 are provided with support dimples 32, 34 and guide tabs 36, 38.

This grid has the same general structure as that of FIG. 1, but with important differences, which will now be described. First, the grid is considerably deeper from top to bottom than the grid of FIG. 1, in order to provide greater support for the fuel rods and to provide greater resistence to lateral loads (loads perpendicular to the axis of the fuel rods). Second, the "dimples" 40, 40', 42, 42' (FIG. 2a) are curved intermediate their length. Their lower portions are vertical, and their upper portions are inclined at the angle A, shown in FIG. 1b. This has been found, in the deeper grids, to give a lower pressure drop than when the entire dimple is inclined, as in FIG. 1. Third, the surfaces of the "dimples" are bowed slightly outward from the plane of the sheets from which they are formed at the intermediate part of the straight portions, as shown at 44. When the rods are inserted, these bowed portions are flattened, as shown at 46. It is important that this deflection be within the elastic limit of the material so that these "dimples" act as springs, pressing against the rods when the reactor is in operation. For additional flexibility, elongated cut-out portions or apertures 47 are provided in the grid strips between and parallel to the straight portions of "dimples" or channels 40, 40', 42, 42'. The widths of the cut-outs may vary from mere slits to the entire distance between "dimples", depending on the degree of flexibility desired. As with the intermediate mixing grid, shown in FIG. 1, the nozzles formed by the dimples are inclined in such directions as to produce swirling about each fuel rod 48 with the direction of swirl alternating clockwise-counterclockwise around adjacent rods throughout the assembly, to provide optimum heat exhange and also fluid exchange between rods.

The assembly may also be provided with guide bars 48', which have outer surfaces 49 between grid spacers which lie in the same planes as the outer surfaces of perimeter strips 30 or slightly outwardly thereof. They facilitate insertion of the assemblies into the reactor.

Figures 3, 3A, 3B:
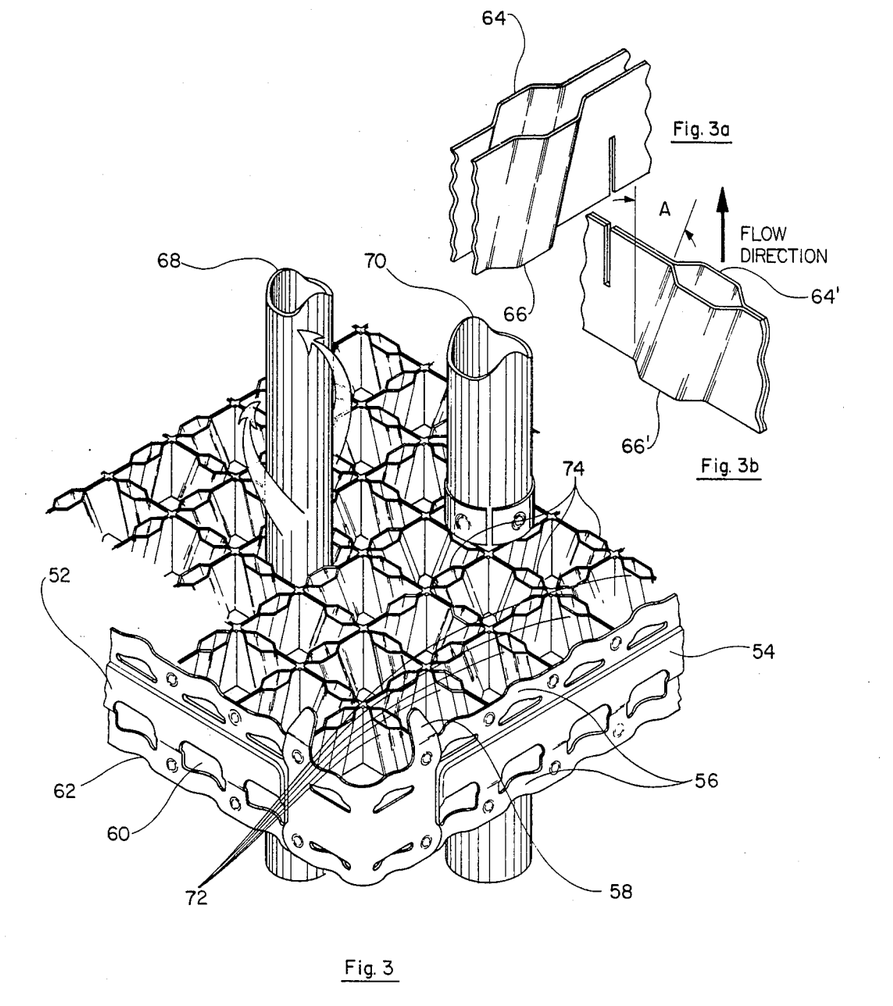
FIG. 3 is partial perspective view of a support-deflector grid used with boiling water reactors.
FIGS. 3a and 3b are views similar to FIGS. 1a and 1b, showing details of structure.

FIG. 3 shows another form of grid which is used as a support and mixing grid in boiling water reactors. A typical boiling water reactor is shown in U.S. Pat. No. 3,431,170, granted March, 1969 to James L. Lass and Dominic A. Venier. In these, lateral loads on the support grids are less than in pressurized water reactors since the BWR assemblies are enclosed in individual flow channels, such as member 62 of the Lass and Venier patent. The grid can, therefore, ordinarily approximate the intermediate type shown in FIG. 1. As in previously described forms, the grid includes peripheral strips 52, 54, which are deformed to provide peripheral support dimples 56 and are provided with inwardly inclined guide tabs 58. The lower portions of the strips 52, 54 contain openings 60. The lower margins below the opening 60 are bent inwardly at 62. This provides "scoops", which cause cooling water to be diverted into the peripheral grid spaces.

Figure 4A:
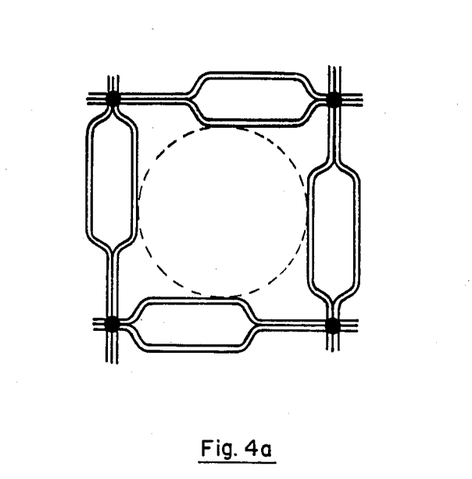
FIGS. 4a and 4b show, respectively, the top and bottom of the spacer of FIG. 3.
Figure 4B:
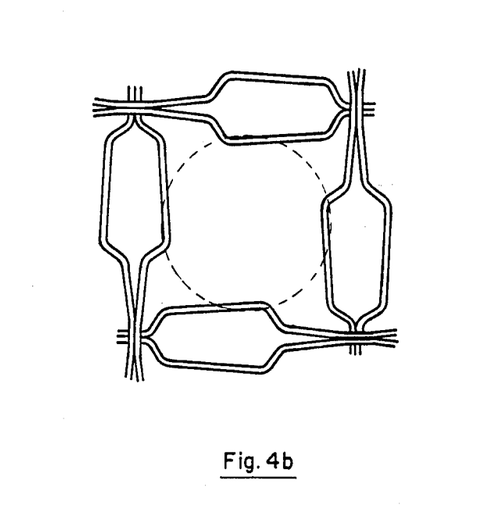

The dimples 64,64', 66, 66', have essentially the same form as those of FIG. 1, and are similarly disposed about the fuel rods 68. At the top of the grid, the sheets forming the grid strips are welded together at all intersections, as shown in FIG. 4a. At the bottom, they are not welded, as shown in FIG. 4b. At the top, the distance between opposing support surfaces is made approximately equal to the fuel rod diameter (see FIG. 4a). At the bottom, where the strips are not welded thogether, the support surfaces are so formed that they inscribe a circle smaller than the fuel rod diameter, as shown in FIG. 4b. Insertion of the rod into the spacer deflects a strip away from its original position, resulting in a spring action.

Thus, we now have a relatively rigid and accurately located four-point dimple support on the top and four springs at the bottom. Rod position is not affected by variations in spring strength. If desired, the welds may by reversed, i.e. they may be placed at the bottom of the strips and the tops left unwelded. The choice would probably depend on the direction from which the rods would be inserted into the assembly during fabrication. If weaker spring action is desired, all welding at intersections can be eliminated.

Figure 5:
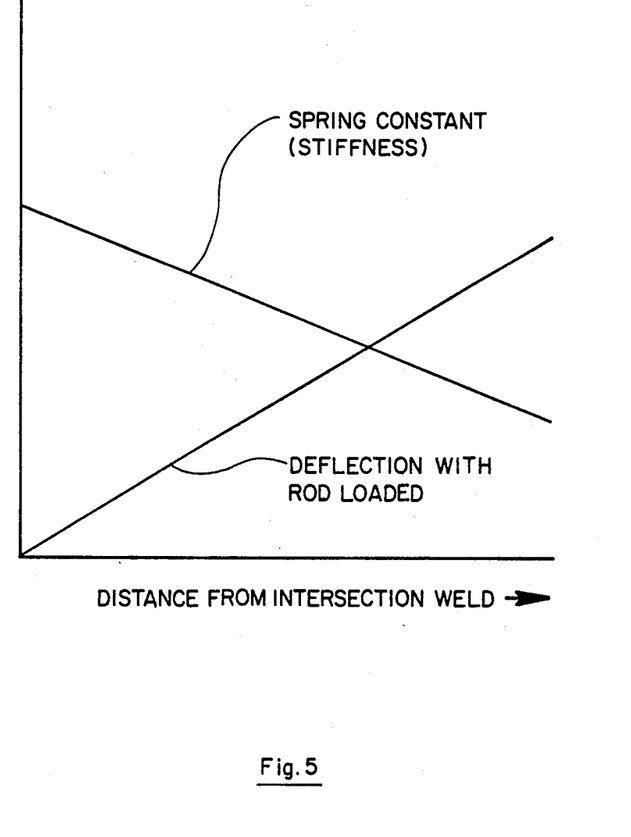
FIG. 5 shows the change in spring stiffness in the structure of FIG. 3, as a function of the vertical distance from the upper (welded) edge of a grid member. It also shows the deflection of the grid member when the rod has been inserted.

FIG. 5 shows the spring constant of the structure as a function of the vertical distance from the intersection welds. It also shows the deflection of the strips when a fuel rod is inserted, as a function of the distance from the intersection weld.

Figure 6:
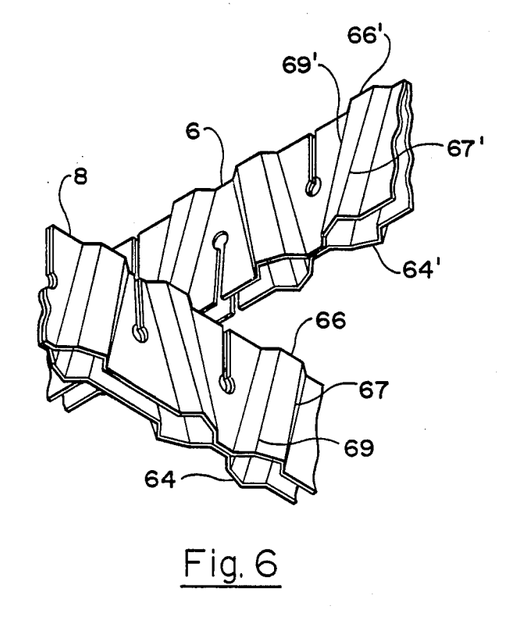
Figure 7:
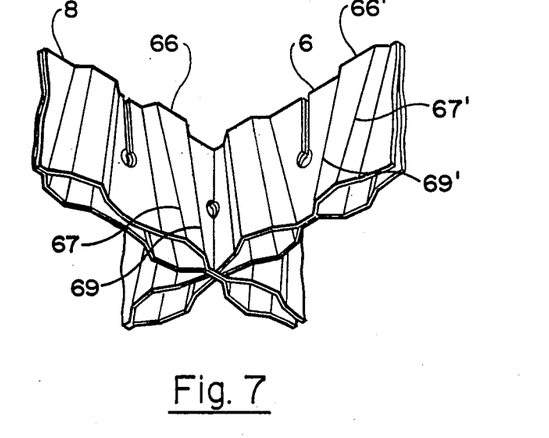

FIGS. 6 and 7 show a detail which is necessary for the proper performance of the grid of FIG. 3 and is highly desirable for that of FIG. 1. Referring to FIG. 7, the surfaces of dimples or channels 66, 66' (and also 64, 64', which are largely hidden) are originally formed twisted. The edges 67, 67', 69, 69' are helical and so related that, at the bottom, the edge of a given channel which is farther from an intersection of grid strips 6 and 8 is higher relative to the plane of the strip of which it is a part, while at the top the heights are the same.

When a fuel rod is inserted from the top, as shown in these figures, the surface between , e.g., edges 67 and 69 is twisted towards a flattened position. This insures that the channels will fit properly against the rods, and facilitates rod insertion. If the rods are to be inserted in the opposite direction, the twist of e.g., surface 67, 67' will be opposite to that shown.

In addition to the fuel rods, boiling water assemblies now usually include one or more "water rods" 70. These are open tubes through which cooling water flows to provide increased moderation. The surfaces of these water rods are comparatively cold as compared to the bulk of the steam-water mixture. The same is true of the periphery of the assembly, since water flows between the flow channels surrounding the fuel assemblies. (See the Lass and Venier patent, column 4, lines 58-75.)

Therefore, instead of having the dimples 64, etc., alternately disposed throughout the assembly, as described above, it may be desirable to arrange, for example, those adjacent perimeter strips 52, 54 and water rods 70 so that they direct water and steam away from relatively cold surfaces. Thus, the passages in the grid strips adjacent to the perimeter strips may be inclined so as to direct water and steam toward the interior of the assembly, which those adjacent to water rod 70 may be positioned so as to direct the coolant away from the water rod. See FIG. 3, where this arrangement is shown at 72 and 74.

While we have described the welding on one side only of the strip, or its omission at grid intersections, in connection with FIG. 3, it will be understood that this practice may also be applied in connection with the structures of FIGS. 1 and 2 if desired.

The preferred materials for the fabrication of these grids are alloys of zirconium. Although zircaloy-4 is commonly used for spacer structures, the zirconium-2.5 niobium alloy may be preferred because for a much lower irradiation-induced creep rate (relaxation rate), higher strength, and better corrosion resistance.

It is known that springs fabricated from zirconium alloys, and most other metals for that matter, relax under irradiation. The extent of relaxation is a function of the irradation dose (fluence) and the applied stress level. Lower stress levels result in a lower spring relaxation rate. Although complete spring relaxation need not result in fretting corrosion and rod failure if other design precautions are taken, conservatism would dictate the spring relaxation rate be minimized to the extent feasable.

The spacer structural stiffness and deflection characteristics shown in FIG. 5 minimize stress levels, resulting in a lower radiation-induced relaxation rate in the structure.

While we have described several embodiments of our invention in detail, it will be understood that various changes may be made, for example, there might be three sets of strips at 60° to each other. We therefore wish the scope of our patent to be limited solely by the scope of the appended claims.

The embodiments of the invention in which a proprietary right or priviledge is claimed are defined as follows:

1. A grid for a nuclear reactor fuel assembly comprising a plurality of horizontally extending grid strips, said strips being arranged in sets at an angle to each other, forming polygonal spaces between them; said strips being formed with generally vertically extending tubular passages, at least the upper portions of said passages being inclined to the vertical, and being disposed about each of said spaces to produce a swirling motion of water above said spaces.

2. A grid as defined in claim 1, wherein each strip comprises two narrow sheets of metal, each having an upper and a lower edge, at least one of said sheets of a given strip being deformed to give channels inclined to the perpendicular relative to said upper edge, said sheets being positioned with the channels of said one sheet mating with the other sheet to form said passages.

3. A grid as defined in claim 2, wherein each of said sheets is deformed to give said channels.

4. A grid as defined in claim 3, wherein each of said channel comprises a surface facing into one of said polygonal spaces so as to contact a fuel rod, said surface being twisted in such a manner that, when a fuel rod is inserted, it will be twisted toward a flattened configuration.

5. A grid as defined in claim 3, wherein the channels of said sheets are mated to give said passages.

6. A grid as defined in claim 2, wherein the strips of each set intersect the strips of the other set, and wherein the sheets forming each of said strips are welded together at one only of said edges at the intersections, thereby giving a spring action to said strips.

7. A grid as defined in claim 1, wherein each of said passages comprises an upper and a lower portion and wherein the lower portions of said passages are vertical.

8. A grid as defined in claim 2, wherein each of said channels comprises a lower portion, which is substantially perpendicular to said upper edge, and an upper portion which is inclined to the perpendicular relative to said upper edge.

9. A grid as defined in claim 8, wherein said perpendicular portion is bowed outwardly intermediate its length, relative to the plane of the sheet from which it is formed, thereby providing a spring.

10. A grid as difined in claim 9, wherein said grid strips are provided with apertures adjacent said perpendicular portions to impart added flexibility.

11. A grid as defined in claim 10 wherein said apertures are elongated and parallel to said perpendicular portions.

12. A nuclear fuel assembly comprising a large number of closely spaced parallel rods;
- a plurality of spacer grids positioned at right angles to said rods, each of said grids being formed of at least two sets of narrow, thin plates at an angle to each other, thereby forming polygonal spaces, through which said rods extend, said grids being spaced along said rods;
- mixing grids positioned between at least some of said spacer grids, and positioned substantially perpendicularly to said fuel rods;
- each of said mixing grids comprising a plurality of grid strips extending perpendicular to said rods, said strips being arranged in sets at an angle to each other, forming polygonal spaces through which said rods extend;
- said strips being formed with tubular passages, at least the upper portions of said passages positioned at acute angles to the axes of said rods, and being disposed about saidspaces in such a manner as to produce a swirling motion of water above said spaces.

13. A fuel assembly for a boiling water nuclear reactor comprising a plurality of elongated, parallel, closely spaced fuel rods;
- at least one spacing and deflecting grid positioned perpendicularly to said rods, said grid comprising at leat two sets of grid strips positioned at an angle to each other and defining polygonal spaces through each of which a fuel rod passes;
- each of said grid strips being formed with tubular passages inclined at an acute angle to the axes of said fuel rods and postioned in the walls of at least the major portion of said polygonal spaces;
- at least some of said passages being positioned so as to cause swirling of water above one of said spaces about the rod passing through it.

14. A fuel assembly as defined in claim 13 wherein some of said passages are positioned so as to deflect coolant passing through said assembly away from surfaces cooler than said coolant.

15. A fuel assembly as defined in claim 14 wherein one of said surfaces forms the periphery of said assembly and the passages adjacent the polygonal spaces next to the periphery are arranged to direct the coolant inwardly.

16. A fuel assembly as defined in claim 14 wherein at least one of said surfaces is a tube parallel to said fuel rods, through which water flows during reactor operation, and wherein some of said passages are positioned to direct coolant away from said tube.

* * * * *